UNITED STATES PATENT OFFICE.

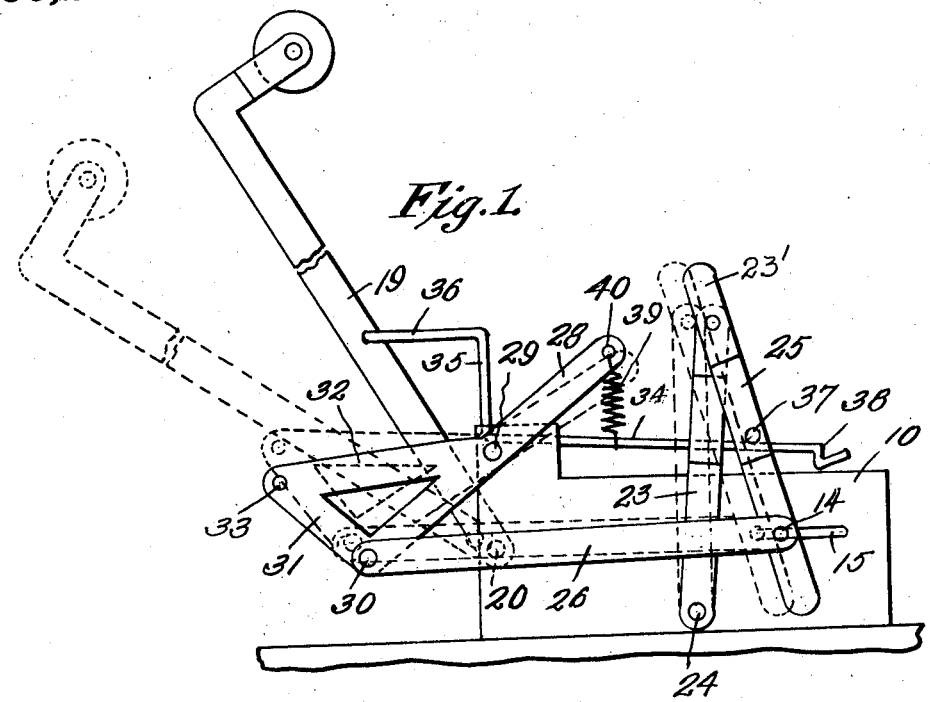
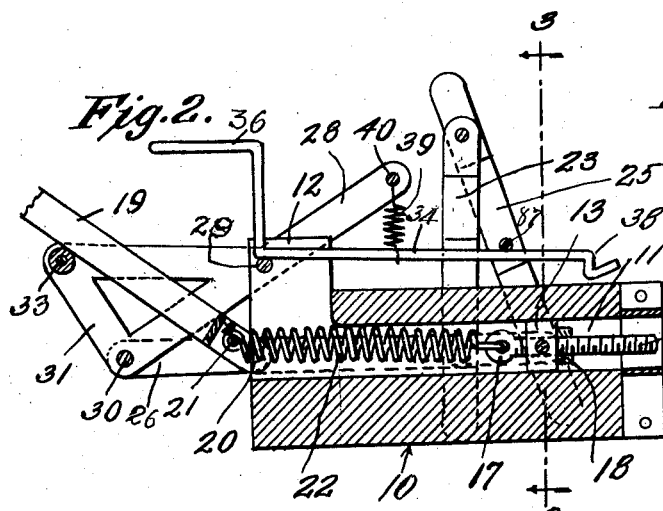
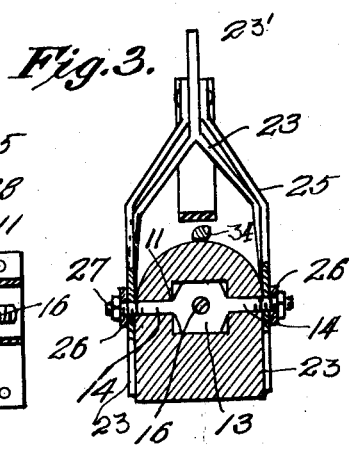

MIKE SHUKITES, JR., OF JOHNSTON CITY, ILLINOIS.

TROLLEY-CONTROL.

1,350,243.  Specification of Letters Patent.  Patented Aug. 17, 1920.

Application filed February 27, 1918. Serial No. 219,476.

*To all whom it may concern:*

Be it known that I, MIKE SHUKITES, Jr., a citizen of the United States, residing at Johnston City, in the county of Williamson and State of Illinois, have invented certain new and useful Improvements in Trolley Controls, of which the following is a specification.

This invention has relation to trolley pole attachments and has for an object to provide means of a resilient nature for retaining the trolley pole in a position to insure engagement of the trolley wheel with the wire, and means operable automatically when the trolley pole moves upward owing to disengagement of the trolley wheel from the wire to release the resilient means whereby to permit the trolley pole to drop to a position wherein the possibility of injury to the trolley pole or other parts of the system is obviated.

Another object of the invention is to provide a trolley pole controlling means in the nature of a casing to be secured upon the roof of the car, adapted to support the trolley pole with a resilient means such as a spring engaging the trolley pole to retain the trolley wheel in engagement with the wire, a trigger means acting to retain the spring under tension, whereby in the event that the wheel becomes disengaged from the trolley to permit the trolley pole to move upward, the trigger may be thus engaged by the pole to cause release of the spring, and the consequent return of the trolley pole to a lowered position, and means resiliently supporting the trolley pole in its lowered position and capable of retensioning the spring when suitably actuated by a downward pull upon the trolley pole.

A still further object of the invention is to provide a controlling device for trolley poles of the character above set forth which is extremely simple in construction, easily and quickly operated and which may be manufactured at a nominal cost.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in side elevation of a trolley pole and controlling means therefor constructed in accordance with my invention.

Fig. 2, is a view of the trolley pole supporting and controlling means in longitudinal section, and Fig. 3, is a view in vertical transverse section taken on the line 3—3 of the preceding figure.

With reference to the drawings, 10 indicates a casing having a longitudinally extending bore 11 therein. A pair of upstanding ears 12 are formed at one end of the casing the space between the same communicating with a bore as is shown. Movable within the bore 11 is a block 13 having oppositely extending trunnions 14 which extend through longitudinally extending slots 15 in the sides of the casing. The block 13 is formed with a transverse opening to receive a bolt 16 which passes loosely therethrough, an eye 17 being formed upon one end of the bolt, and a nut 18 applied to the other to bear against the block.

Mounted upon the casing adjacent that end supporting the ears 12 is a trolley pole indicated at 19 pivotally mounted upon a bolt 20. A bolt 21 is mounted in the trolley pole at a point above the fulcrum thereof, and one end of a heavy coil spring 22 is connected to said bolt 21, the other end extending into the bore of the casing for connection to the eye 17 of the bolt 16.

Extending upwardly from an intermediate point of the casing and at the sides thereof, are two arms 23, the same being pivotally mounted for movement about points 24 located adjacent the base of the casing with the upper end of said arms bent toward each other and merging into a lever 23′ which is pivotally connected to the upper end of a pair of arms 25 forming a part of the trigger or retaining mechanism. (See Fig. 3). The arms 25, of which two are provided extend downwardly in diverging relation from their point of connection to the lever 23′ at opposite sides of the casing and are connected together by means of the oppositely extending trunnions 14 of the block which pass through openings in said arms 25. The trunnions 14 after passing through the openings of the arms 25 also enter openings in the forward end of links 26 of which a pair are provided, one at each side of the casing, to extend rearwardly in a horizontal plane. Nuts 27 are subsequently applied to the projecting ends of the trunnions 14 which are threaded for that purpose to secure the links 26 and arms 25 against displacement.

A trolley pole support is provided in the nature of a pair of levers 28 pivoted at a point intermediate their ends upon a transversely extending bolt 29 which is supported upon the ears 12, one of said levers 28 being provided at each side of the casing and engaging against the outer faces of the ears. The levers 28 are disposed in a normally inclined position with their lower ends apertured to receive rivets or the like 30 which serve to engage the rear ends of the above mentioned links 26 for pivotal connection thereto. The lower ends of the levers 28 adjacent the point of connection to the links 26 are formed with angularly extending extensions 31 which extend upwardly, with the upper terminals thereof connected by means of braces 32 with the intermediate portion of the levers 28 so as to define a triangular structure at the lower end of said levers to provide rigidity. The upper ends of the extensions 31 are connected together by means of a transversely extending bolt 33 which also serves as a rest for the trolley pole in a manner which will be presently obvious. It will be noted that the trolley pole 19 operates between the levers 28 and between the bolt 33 and the rear end of the casing, the lower ends of the levers 28 extending beyond the casing as shown in the drawings. Mounted upon the transversely extending bolt 29 mentioned above is an angular member forming a trigger comprising a horizontally extending arm 34 and a rightangular, upwardly extending arm 35 formed integrally therewith, the upper terminal of said arm 35 being bent rearwardly to form the pole engaging member 36, the same being preferably bifurcated. The horizontal arm 34 extends toward the forward end of the casing, between the arms 23 and 25 and beneath a transversely extending bolt or rod 37 connecting the arms 25 at a point above the casing. The forward end of the arm 34 is formed with a depressed or offset portion 38 in which to receive the bolts 37 when the mechanism is in an operative position. A coil spring 39 is further provided, being connected at one end to the arm 34 and at its opposite end to the upper ends of the levers 28 which converge above the casing and are connected together by means of a rivet 40 to which the spring is connected.

In operation, to place the spring 22 under tension so as to cause the same to act to urge the trolley pole upward to engage the trolley wheel, against the wire, the trolley pole is initially pulled downwardly by means of a cord attached to the same until engaged against the bolt 33. By a continued downward movement of the trolley pole the levers 28 are rocked so as to move the links 26 longitudinally and in a forward direction thereby sliding the block 13 within the casing in a forward direction to place the spring 22 under strain. The forward movement of the block 13 is continuous until the bolt 37 connecting the arms 25 is brought into a position beyond the forward ends of the arms 34 of the trigger whereby spring 39 may act to move the arms 34 upward slightly and securely seat the depending portion 38 of the arms adjacent the bolt 37. By momentarily releasing the trolley, the parts will be held against return to the position to which they have been moved. The spring 22 will now be under strain and the trolley pole 19 will be urged upward and the trolley wheel retained in engagement with the wire in the usual manner. In the event that the trolley wheel becomes disengaged from the trolley wire the pole will fly upward under tension of the spring 22 until forcibly brought into engagement with the end 36 of the upwardly extending arms 34 of the trigger. The forward end of the arm 34 will then be moved down slightly to a degree sufficiently to disengage the bolt 37 of the arms 25 thereby releasing the spring 22 which becomes immediately ineffective or expanded by rearward movement of the block 13. The trolley pole being no longer supported falls downward until its movement is limited by engagement with the bolt 33 and the pole is thus supported in a lowered position wherein the possibility of contact with the trolley wire support is prevented. It will be noted that when the trolley pole engages the said bolt 33 the weight of the pole will cause the levers 28 to rock and thereby act to tension the spring, to an amount however, not sufficient to return the blocks 13 to upward position the spring thus acting as a cushioning means to prevent injury to the pole by the forcible contact with the bolt 33. To reëstablish the parts in operative relation it is but necessary to again move the trolley pole 19 downward in the manner stated at the beginning of this paragraph.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention, what

I claim as new and desire to secure by Letters Patent is:—

1. A trolley pole control and support including a casing, a trolley pole pivotally mounted thereon, a pair of spaced levers pivotally mounted at points intermediate their ends upon the casing, a bolt connecting adjacent ends of said levers to afford a support for the trolley pole in its lowered position, a coil spring within the casing having one end connected to the trolley pole, a block slidably mounted in the casing to which the other end of the spring is secured, links connecting said levers with the block, a pair of arms connected to the block, a transverse bolt carried by said arms, a bell crank member pivotally mounted on the casing to engage the bolt to retain the block in shifted position to tension the spring, and a coil spring connecting said arm with the levers, the bell crank member being engageable by the trolley pole when suddenly moved upward to release the bolt whereby the block may return to normal position to render the spring effective.

2. A trolley pole supporting and controlling device, including a casing, a trolley pole mounted thereon, a coil spring connected at one end to the trolley pole, a block slidably mounted in the casing to which the other end of the spring is connected, a pair of upstanding arms pivotally mounted upon the casing at opposite sides thereof, a pair of depending arms pivotally connected to the upper ends of the first mentioned arms, and having their lower ends pivotally connected to the block, a bolt connecting the second mentioned arms, a bell crank having one arm extending beneath the bolt for engagement by the bolt, when the block is shifted to tension the spring, and means operable upon downward movement of the pole to shift the block.

In testimony whereof I affix my signature in presence of two witnesses.

MIKE SHUKITES, Jr.

Witnesses:
ROBT. JACOBY,
HARRY HILLER.